(12) United States Patent
Yuen et al.

(10) Patent No.: US 10,372,689 B1
(45) Date of Patent: Aug. 6, 2019

(54) CONSUMER-DEFINED SERVICE ENDPOINTS

(71) Applicant: INTUIT INC., Mountain View, CA (US)

(72) Inventors: Billy Yuen, Mountain View, CA (US); Ryan M. Bickerstaff, Palo Alto, CA (US)

(73) Assignee: INTUIT, INC., Mountain View, CA (US)

( * ) Notice: Subject to any disclaimer, the term of this patent is extended or adjusted under 35 U.S.C. 154(b) by 921 days.

(21) Appl. No.: 14/451,120

(22) Filed: Aug. 4, 2014

(51) Int. Cl.
*G06F 17/30* (2006.01)
*G06F 16/21* (2019.01)
*G06F 21/60* (2013.01)
*G06F 16/245* (2019.01)

(52) U.S. Cl.
CPC .......... *G06F 16/211* (2019.01); *G06F 16/245* (2019.01); *G06F 21/60* (2013.01)

(58) Field of Classification Search
CPC ......... G06F 17/30569; G06F 17/30067; G06F 17/30286
USPC .... 707/756, 714, 706, 14.34, 661, 760, 810, 707/755; 705/14.34, 75
See application file for complete search history.

(56) References Cited

U.S. PATENT DOCUMENTS

| | | | | |
|---|---|---|---|---|
| 5,418,943 A * | 5/1995 | Borgida | ............ | G06F 17/30507 |
| 7,149,746 B2 * | 12/2006 | Fagin | ................ | G06F 17/30569 707/756 |
| 7,739,316 B2 * | 6/2010 | Thompson | ........ | G06F 17/30595 707/803 |
| 7,904,468 B2 * | 3/2011 | Neil | .................. | G06F 17/30973 707/763 |
| 8,631,034 B1 * | 1/2014 | Peloski | ............... | G06F 17/5009 706/12 |
| 8,868,467 B2 * | 10/2014 | Serebrennikov | | ........................... G06F 17/30887 705/75 |
| 8,898,203 B2 * | 11/2014 | Leland | ............. | G06F 17/30395 707/805 |
| 9,152,966 B2 * | 10/2015 | Gore | .................... | G06Q 10/101 |
| 2003/0126212 A1 * | 7/2003 | Morris | ............. | G06F 17/30265 709/205 |
| 2003/0195921 A1 * | 10/2003 | Becker | .................... | H04L 29/06 709/200 |
| 2004/0133876 A1 * | 7/2004 | Sproule | ................ | G06Q 10/063 717/105 |
| 2004/0143792 A1 * | 7/2004 | Demopoulos | ....... | G06F 17/2247 715/234 |
| 2005/0154765 A1 * | 7/2005 | Seitz | ...................... | G06F 9/5016 |
| 2006/0059171 A1 * | 3/2006 | Borthakur | ......... | G06F 17/30067 |
| 2006/0200425 A1 * | 9/2006 | Steele | ..................... | G06F 21/41 705/64 |
| 2007/0005801 A1 * | 1/2007 | Kumar | .................... | H04L 63/08 709/238 |

(Continued)

*Primary Examiner* — Hung Q Pham
(74) *Attorney, Agent, or Firm* — Patterson + Sheridan, LLP (57) ABSTRACT

The disclosed embodiments provide a system that facilitates data processing. During operation, the system obtains a schema for data accessed using web services provided by multiple endpoints, wherein the schema is provided by a consumer of the data. Next, the system uses the schema to create a custom endpoint for accessing the data. The system then enables, for the consumer, access to the data through the custom endpoint without requiring querying of the multiple endpoints by the consumer.

13 Claims, 6 Drawing Sheets

(56) References Cited

U.S. PATENT DOCUMENTS

| | | | | |
|---|---|---|---|---|
| 2008/0109481 | A1* | 5/2008 | Catanzariti | G06F 17/30867 |
| 2009/0328067 | A1* | 12/2009 | Srinivasan | G06F 8/30 |
| | | | | 719/316 |
| 2010/0332308 | A1* | 12/2010 | Yap | G06Q 20/204 |
| | | | | 705/14.34 |
| 2011/0072055 | A1* | 3/2011 | Swaminathan | H04L 67/16 |
| | | | | 707/810 |
| 2011/0184969 | A1* | 7/2011 | Idicula | G06F 17/30938 |
| | | | | 707/760 |
| 2011/0225125 | A1* | 9/2011 | Colgrave | G06F 17/30887 |
| | | | | 707/689 |
| 2011/0258179 | A1* | 10/2011 | Weissman | G06F 17/30389 |
| | | | | 707/714 |
| 2012/0005610 | A1* | 1/2012 | Schulze | G06Q 10/10 |
| | | | | 715/771 |
| 2013/0061126 | A1* | 3/2013 | Pawlowsky | G06F 21/64 |
| | | | | 715/234 |
| 2013/0073573 | A1* | 3/2013 | Huang | G06F 17/30563 |
| | | | | 707/755 |
| 2013/0086100 | A1* | 4/2013 | de Cerqueira Gatti | G06F 17/3092 |
| | | | | 707/769 |
| 2014/0095471 | A1* | 4/2014 | Deshmukh | G06F 17/30463 |
| | | | | 707/714 |
| 2014/0351233 | A1* | 11/2014 | Crupi | G06F 17/30516 |
| | | | | 707/706 |
| 2015/0161180 | A1* | 6/2015 | Hermanns | G06F 8/20 |
| | | | | 707/810 |
| 2015/0331675 | A1* | 11/2015 | De Magalhaes | G06F 8/20 |
| | | | | 717/104 |

* cited by examiner

CONSUMER-DEFINED SERVICE ENDPOINTS

BACKGROUND

Related Art

The disclosed embodiments relate to web service endpoints. More specifically, the disclosed embodiments relate to techniques for providing consumer-defined service endpoints for accessing resources.

Web services may be used to access data and other resources over a network. For example, a client may query a Representational State Transfer (REST) service endpoint for data from a database table, directory, file, image, message, and/or other data entity. To retrieve the data, the client may request the data from the endpoint using a stateless protocol such as HyperText Transfer Protocol (HTTP) and one or more Uniform Resource Identifiers (URIs) for resources containing the data, and the endpoint may respond to the request with representations of the resources, such as serialized objects representing database records.

However, service-oriented architectures such as REST may require a separate round trip for data from each entity and/or endpoint. For example, two REST endpoints may provide data related to a "Company" entity and an "Employee" entity, respectively. To retrieve employee records associated with 100 different companies, a client may query the "Company" endpoint to obtain the list of 100 companies, and then make 100 separate calls to the "Employee" endpoint to obtain a separate set of employee records for each company, thus requiring 101 separate round trips with the endpoints.

Moreover, data transmitted from the endpoints may be associated with a large payload size, which may result in noticeable latency over cellular networks and/or other lower-bandwidth networks. For example, an endpoint may return all fields in an entity, even if a client requires only one or two fields from the entity. Consequently, the retrieval of data from multiple entities and/or endpoints in a service-oriented architecture may be inefficient or time-consuming.

SUMMARY

The disclosed embodiments provide a system that facilitates data processing. During operation, the system obtains a schema for data accessed using web services provided by multiple endpoints, wherein the schema is provided by a consumer of the data. Next, the system uses the schema to create a custom endpoint for accessing the data. The system then enables, for the consumer, access to the data through the custom endpoint without requiring querying of the multiple endpoints by the consumer.

In some embodiments, the system also validates the schema prior to creating the custom endpoint.

In some embodiments, using the schema to create the custom endpoint includes using a query definition from the schema to construct a query for retrieving the data without using the multiple endpoints.

In some embodiments, using the schema to create the custom endpoint further includes creating a first mapping from an entity name associated with the custom endpoint to the query, and creating a second mapping from an identifier for the consumer to the entity name.

In some embodiments, enabling, for the consumer, access to the data through the custom endpoint includes:

(i) obtaining, from the consumer, a request containing one or more parameters for accessing the data;
(ii) adding the one or more parameters to the query to construct a final query;
(iii) executing the final query against a database to obtain the data; and
(iv) providing the data to the consumer.

In some embodiments, enabling, for the consumer, access to the data through the custom endpoint further includes using the first and second mappings to match the request to the custom endpoint and the query.

In some embodiments, the query includes one or more joins among entities associated with the multiple endpoints.

In some embodiments, the custom endpoint includes a representational state transfer (REST) component.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The disclosed embodiments provide a method and system for facilitating data processing. More specifically, the disclosed embodiments provide a method and system for facilitating data access through web service endpoints such as representational state transfer (REST) endpoints. The data may be accessed using web services provided by multiple endpoints. For example, each endpoint may be configured to enable access to an entity and/or set of resources associated with the entity. As a result, multiple queries and/or round trips may be required to obtain data associated with multiple entities.

To simplify access to data provided by multiple endpoints, a custom endpoint for accessing the data may be created using a schema for the data, as provided by a consumer of the data. The custom endpoint may include a query for retrieving the data that is created using a query definition from the schema. A first mapping from an entity name associated with the custom endpoint to the query may then be created, along with a second mapping from an identifier for the consumer to the entity name. The consumer may then use the same identifier to obtain the data from the endpoint in a single round trip, thus reducing the overhead associated with retrieving the same data from the other, multiple endpoints.

Figure 1:
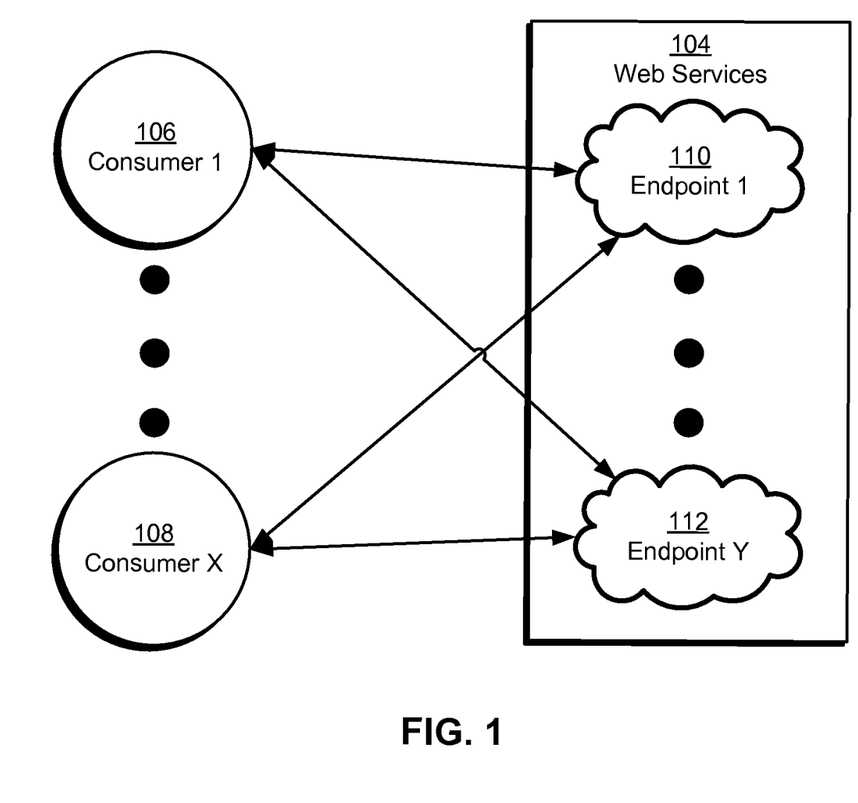
FIG. 1 shows a schematic of a system in accordance with the disclosed embodiments.

FIG. 1 shows a schematic of a system in accordance with the disclosed embodiments. As shown in FIG. 1, a set of web services 104 may be provided by a number of endpoints (e.g., endpoint 1 110, endpoint y 112). For example, the endpoints may be representational state transfer (REST) endpoints and/or other service-oriented endpoints that provide web services 104 for accessing a set of resources such as files, database tables, images, messages, objects, web pages, and/or other types of data. Each endpoint may be responsible for enabling access to a different data entity, such as a set of data fields related to a physical object or location (e.g., car, house, person, animal, country, planet, item for sale, etc.), event (e.g., party, appointment, house sale, birth, death, etc.), and/or abstract object or concept (e.g., financial transaction, order, theory, rule, organization, etc.).

To use web services 104, a set of consumers (e.g., consumer 1 106, consumer x 108) may send requests for the resources to the endpoints, and the endpoints may respond to the requests with the data. For example, each consumer may be a client such as a web browser, web application, and/or mobile application that uses data provided by one or more servers acting as endpoints for web services 104. The consumer may include a Uniform Resource Identifier (URI) for a resource in a request to an endpoint, and the endpoint may use the URI to retrieve the resource from a database and/or other data-storage mechanism and return a representation of the resource to the consumer. Such separation and/or decoupling of data storage by the endpoints from use of the data by the consumers may improve the portability, scalability, and/or modularity of the consumers and endpoints.

On the other hand, the separation of concerns provided by the endpoints and consumers may preclude flexible and/or efficient querying of data from multiple endpoints. For example, a consumer may send a request to a "Company" endpoint to obtain a list of 100 "Company" records representing the 100 largest companies in a given city, and then for each of the "Company" entities, send a separate request to an "Employee" endpoint to obtain a list of "Employee" records for each of the 100 "Company" records. As a result, 101 round trips may be performed between the consumer and endpoints to obtain employee information for all 100 companies. Moreover, if the consumer queries the "Company" endpoint for the 100 largest companies in five different cities, the number of round trips may increase by a factor of five. In other words, the overhead associated with retrieving data from service endpoints may increase exponentially with the number of endpoints being queried.

Figure 2:
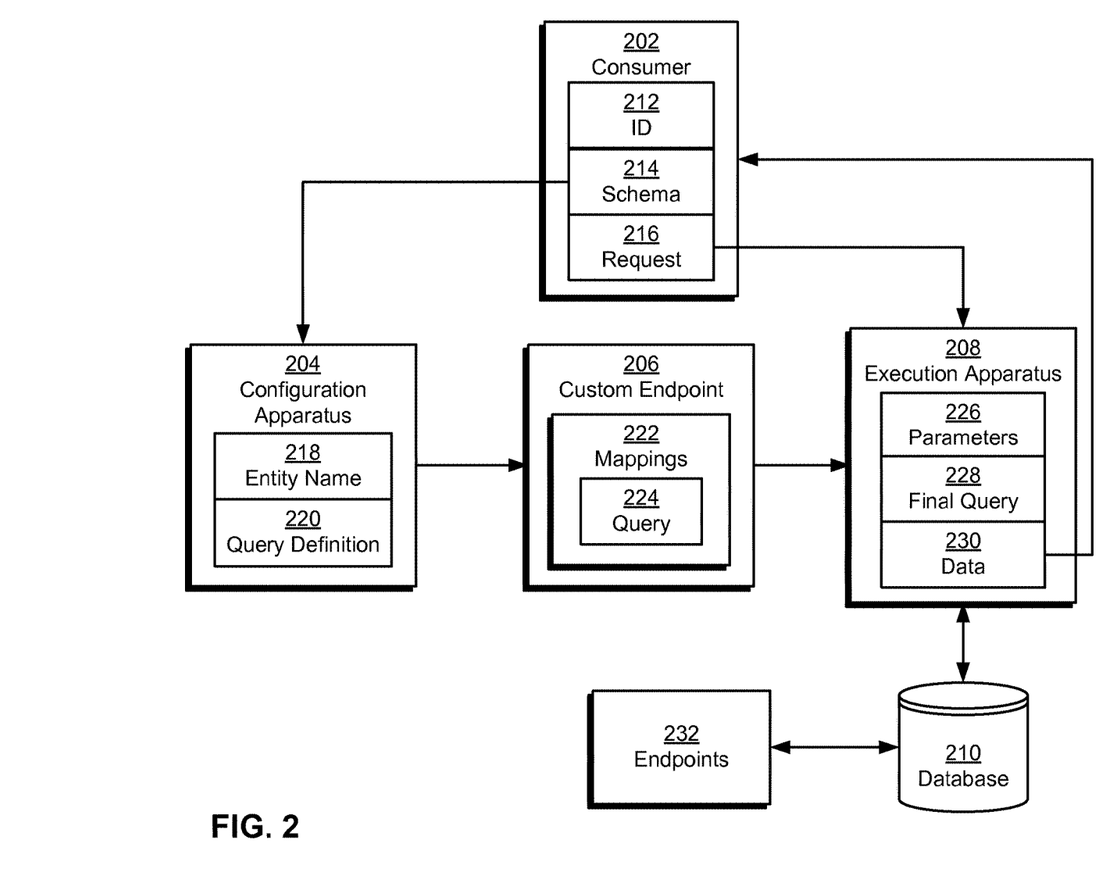
FIG. 2 shows a system for facilitating data processing in accordance with the disclosed embodiments.

In one or more embodiments, access to data through web services 104 is improved by creating one or more custom endpoints for querying of data associated with multiple endpoints. As shown in FIG. 2, a consumer 202 may provide a schema 214 for a set of data 230 from one or more entities in a database 210 to a configuration apparatus 204. After validating schema 214, configuration apparatus 204 may use schema 214 to create a custom endpoint 206 for accessing data 230. An execution apparatus 208 may then enable access to data 230 through custom endpoint 206 without requiring querying of the other, multiple endpoints 232 that typically provide data 230 to consumer 202 and/or other consumers.

More specifically, configuration apparatus 204 may receive schema 214 and an identifier 212 for consumer 202 in a request to create custom endpoint 206 from consumer 202. Configuration apparatus 204 may parse schema 214 to obtain an entity name 218 and a query definition 220. Entity name 218 may be an alphanumeric identifier for a custom entity and/or custom endpoint 206, and query definition 220 may define the entities, records, and/or fields to be joined using custom endpoint 206. For example, custom endpoint 206 may be used to retrieve data from the following two entities:

<Employee>
   <FirstName>Bart</FirstName>
   <LastName>Simpson</LastName>
   <Age>25</Age>
   <CompanyName>Acme</CompanyName>
</Employee>
<Company>
   <CompanyName>Acme</CompanyName>
   <Address>XYZ</Address>
   <City>Mountain View</City>
   <State>CA</State>
</Company>

The first entity may have an entity name of "Employee" and fields of "FirstName," "LastName," "Age," and "CompanyName." The second entity may have an entity name of "Company" and fields of "CompanyName," "Address," "City," and "State."

To combine data from both entities, schema 214 may include the following:

<CompanyEmployees
  join="Employee.CompanyName=Company.CompanyName">
  <Employees>
    <Employee>
      <FirstName>Bart</FirstName>
    </Employee>
  </Employees>
  <Company>
    <CompanyName>Acme</CompanyName>
  </Company>
</CompanyEmployees>

Within the exemplary schema 214, "CompanyEmployees" may be entity name 218, and query definition 220 may join the "FirstName" and "CompanyName" fields from the "Employee" and "Company" entities, respectively, based on a join predicate of "Employee.CompanyName=Company.CompanyName."

Alternatively, schema 214 may describe data that is a subset of fields from one entity:

<AppOnePerson>
  <Employee>
    <FirstName>Bart</FirstName>
    <Age>25</Age>
  </Employee>
</AppOnePerson>

In the exemplary schema 214 above, the "AppOnePerson" entity may include a subset of fields (e.g., "FirstName," "Age") from the "Employees" entity. The reduced number of fields in the exemplary schema 214 above may enable a corresponding reduction in payload size during querying of data associated with the "Employee" endpoint. For example, the "AppOnePerson" entity may allow consumer 202 to obtain only the fields from "Employee" that are used by an application running on consumer 202 instead of all fields from "Employee," thereby streamlining the retrieval of data from database 210 by consumer 202.

Next, configuration apparatus 204 may create custom endpoint 206 by using schema 214 to construct a query 224 for retrieving data without using endpoints 232. Configuration apparatus 204 may also create a set of mappings 222, including a first mapping from entity name 218 to query 224 and a second mapping from an identifier (ID) 212 for consumer 202 to entity name 218. As mentioned above, configuration apparatus 204 may obtain ID 212 and schema 214 from a request to create custom endpoint 206 from consumer 202. Configuration apparatus 204 may use query definition 220 from schema 214 to construct a Structured Query Language (SQL) query 224 for retrieving data associated with custom endpoint 206, then store the definition for custom endpoint 206 as a map of ID 212 to another map of entity name 218 to the SQL query 224, or Map(ID 212, Map(entity name 218, query 224)). Configuration apparatus 204 may also create additional mappings of IDs for other consumers to entity name 218 and query to enable use of custom endpoint 206 by the other consumers.

Using the exemplary "CompanyEmployees" schema above, custom endpoint 206 may be queried using the following Uniform Resource Locator (URL) format:

/<ID>/CompanyPersons/
Company?CompanyName=Acme

Within the URL, "<ID>" may represent ID 212 of consumer 202 to distinguish custom endpoint 206 from custom endpoints for other consumers. In addition, "CompanyName" in the URL may be set to different values to query for data related to different values of "CompanyName" from the "Company" and "Employee" entities.

Once custom endpoint 206 is created, execution apparatus 208 may enable use of custom endpoint 206 by consumer 202 in accessing data 230 without querying multiple endpoints 232 that are typically used to retrieve data 230. As shown in FIG. 2, execution apparatus 208 may obtain a request 216 for data 230 from consumer 202, which includes one or more parameters 226 for accessing data 230. Execution apparatus 208 may use mappings 222 to match ID 212 from request 216 to custom endpoint 206 and obtain query 224 from custom endpoint 206. Such matching may be performed to both identify custom endpoint 206 for use with request 216 and restrict use of custom endpoint 206 to consumer 202 and/or other consumers that are authorized to use custom endpoint 206.

Execution apparatus 208 may then add parameters 226 to query 224 to construct a final query 228, execute final query 228 against database 210 to obtain data 230 that matches the request, and provide data 230 to consumer 202. For example, execution apparatus 208 may form final query 228 by adding parameters 226 as one or more "WHERE" clauses to a SQL query 224 and submit final query 228 to a SQL database 210. After receiving data 230 in a response to final query 228 from database 210, execution apparatus 208 may serialize, marshal, and/or otherwise format data 230 into a form that can be used by consumer 202 and transmit the formatted data 230 to consumer 202.

By enabling querying of data associated with multiple endpoints (e.g., endpoints 232) and/or a subset of data or fields from a single endpoint or entity, the system of FIG. 2 may increase the efficiency and/or simplicity of data retrieval from database 210 over conventional querying of service-oriented endpoints. In addition, the use of schemas (e.g., schema 214) to define custom endpoint 206 may allow a third-party consumer 202 (e.g., developer) to access resources in database 210 without uploading code to configuration apparatus 204 and/or another component of the system. Such lack of third-party code in the system of FIG. 2 may mitigate security issues associated with executing potentially malicious code and/or overhead associated with learning the structure and/or interfaces of the system before writing code to define custom endpoints in the system.

Those skilled in the art will appreciate that the system of FIG. 2 may be implemented in a variety of ways. First, configuration apparatus 204, custom endpoint 206, execution apparatus 208, and database 210 may be provided by a single physical machine, multiple computer systems, one or more virtual machines, a grid, one or more databases, one or more file systems, and/or a cloud computing system. Configuration apparatus 204, custom endpoint 206, and/or execution apparatus 208 may additionally be implemented together and/or separately by one or more hardware and/or software components and/or layers.

For example, consumer 202 may upload ID 212 and schema 214 to a REST endpoint that is mapped to a Java (Java™ is a registered trademark of Oracle America, Inc.) servlet that implements configuration apparatus 204. The Java servlet may validate the correctness of schema 214, obtain entity name 218 and query definition 220 from schema 214, and create mappings 222 and query 224 in custom endpoint 206 from ID 212 and schema 214. After custom endpoint 206 is created, a separate Java servlet implementing execution apparatus 208 may process requests to custom endpoint 206 by using mappings 222 to match the IDs in the requests to custom endpoint 206 and query 224, constructing final query 228 from query 224 and parameters 226, executing final query 228 against database 210, and returning data 230 from database 210 to consumer 202.

Second, a number of data formats and/or storage mechanisms may be supported by and/or used with the system of FIG. 2. For example, mappings 222 and query 224 for custom endpoint 206 and/or other custom endpoints may be stored in a table, one or more objects, one or more flat files, and/or one or more relational databases. Query 224 and/or final query 228 may further be formatted as SQL queries, search queries, NoSQL queries, and/or other types of information retrieval queries for various types of databases (e.g., database 210). Finally, data 230 returned by database 210 may be marshaled, serialized, and/or transmitted from execution apparatus 208 to consumer 202 using JavaScript Object Notation (JSON) objects, Extensible Markup Language (XML) documents, property lists, and/or other types of structured data.

Figure 3:
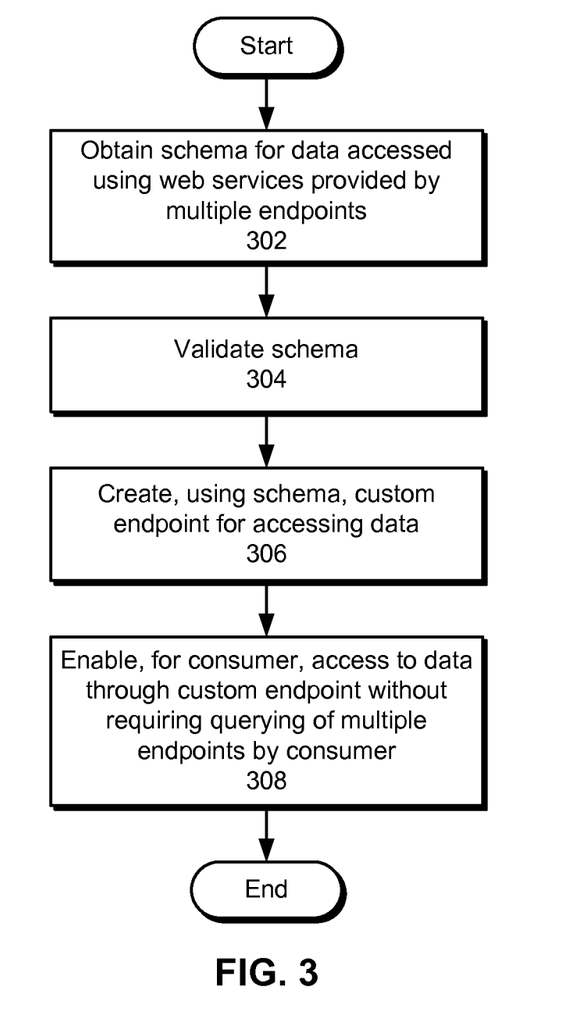
FIG. 3 shows a flowchart illustrating the process of facilitating data processing in accordance with the disclosed embodiments.

FIG. 3 shows a flowchart illustrating the process of facilitating data processing in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

Initially, a schema for data accessed using web services provided by multiple endpoints is obtained (operation 302). For example, the schema may include an entity name associated with the custom endpoint, as well as a query definition for the custom endpoint that identifies records and/or fields from entities that are typically queried using multiple REST endpoints. The schema may be provided by a consumer of the data. For example, the schema may be included in a request from the consumer to create a custom endpoint for accessing the data.

Next, the schema is validated (operation 304). For example, the schema may be analyzed to verify the syntactic and/or structural correctness of the schema. The schema is then used to create the custom endpoint for accessing the data (operation 306), as described in further detail below with respect to FIG. 4. Finally, access to the data through the custom endpoint is enabled for the consumer without requiring querying of the multiple endpoints by the consumer (operation 308), as described in further detail with respect to FIG. 5.

Figure 4:
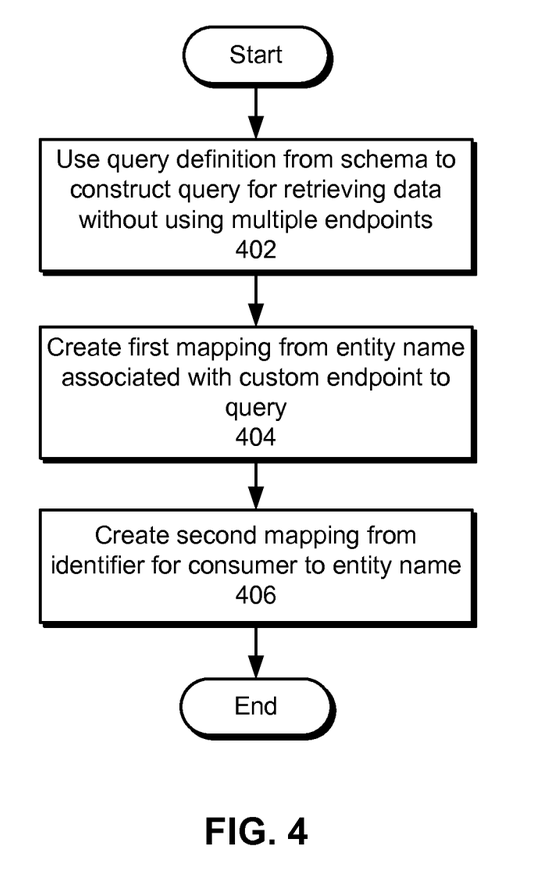
FIG. 4 shows a flowchart illustrating the process of using a schema to create a custom endpoint in accordance with the disclosed embodiments.

FIG. 4 shows a flowchart illustrating the process of using a schema to create a custom endpoint in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

First, a query definition from the schema is used to construct a query for retrieving data without using multiple endpoints (operation 402). For example, a set of fields and one or more database joins from the query definition may be used to construct a SQL query that can be submitted directly to a SQL database in lieu of querying the data using multiple REST endpoints and/or URIs associated with data from multiple entities and/or database tables. In other words, the query may include one or more joins among entities associated with the multiple endpoints.

Next, a first mapping from an entity name associated with the custom endpoint to the query is created (operation 404). The entity name may be included in the schema and uniquely identify the entity associated with data to be retrieved using the query. For example, the entity name may be a unique name for the entity and/or custom endpoint to be created from the schema. Finally, a second mapping from an identifier for a consumer to the entity name is created (operation 406). The identifier may be included with the schema in the consumer's request to create the custom endpoint. For example, the identifier may be a username, numeric identifier, and/or other unique identifier for the consumer.

The custom endpoint may thus be defined using the following: Map(consumer identifier, Map(entity name, query)). In turn, the custom endpoint may enable the efficient retrieval of data that is specific to a use case of the consumer instead of the querying of multiple general-purpose public endpoints by the consumer.

Figure 5:
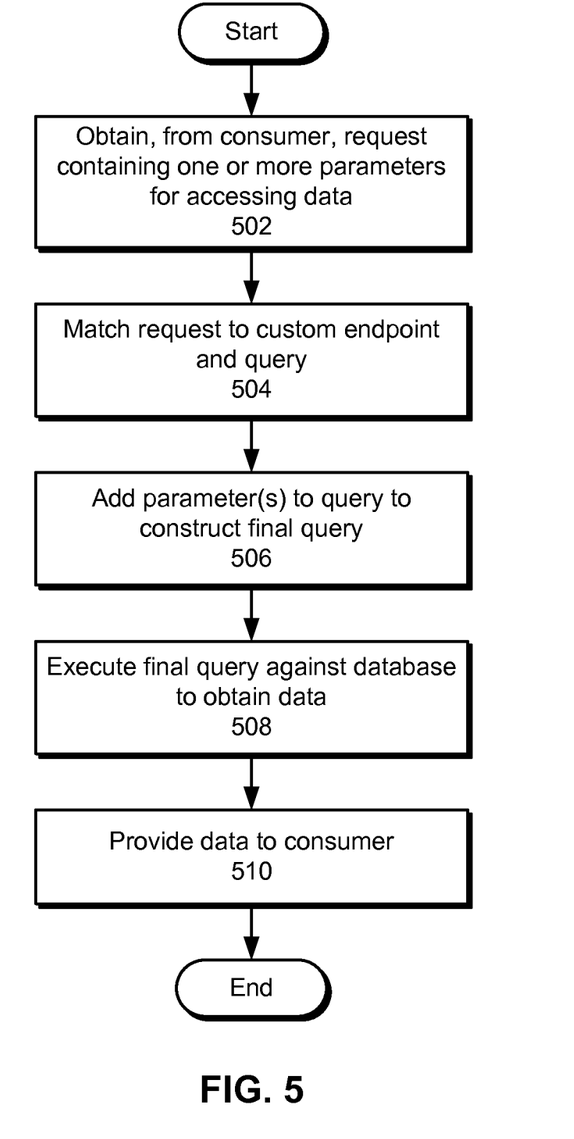
FIG. 5 shows a flowchart illustrating the process of enabling access to data through a custom endpoint in accordance with the disclosed embodiments.

FIG. 5 shows a flowchart illustrating the process of enabling access to data through a custom endpoint in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the embodiments.

First, a request containing one or more parameters for accessing the data is obtained from a consumer (operation 502). The parameters may include regular expressions, thresholds, ranges, values, and/or other criteria that may be applied to one or more fields in the data. Next, the request is matched to the custom endpoint and a query (operation 504) in the custom endpoint. For example, the first and second mappings described above with respect to FIG. 4 may be used to map a consumer identifier and/or entity name from the request to the custom endpoint and query. Such matching of the request to the custom endpoint may restrict access to the custom endpoint to the consumer and/or other consumers that are authorized to use the custom endpoint.

The parameter(s) are then added to the query to construct a final query (operation 506), which is executed against a database to obtain the data (operation 508). For example, the parameter(s) may be added as one or more "WHERE" clauses to a SQL query from the custom endpoint, and the SQL query may be submitted to a SQL database to retrieve data matching the SQL query from the SQL database.

Finally, the data is provided to the consumer (operation 510). For example, the data may be marshaled, serialized, and/or formatted into XML, JSON, property lists, and/or other structured data and transmitted over one or more networks to the consumer to enable use of the data by the consumer. Because a custom query and/or parameter(s) are used to retrieve the data, the consumer may obtain most or all of the data required by an operation or application using a single request and/or round trip instead of multiple requests and/or round trips with multiple endpoints.

Figure 6:
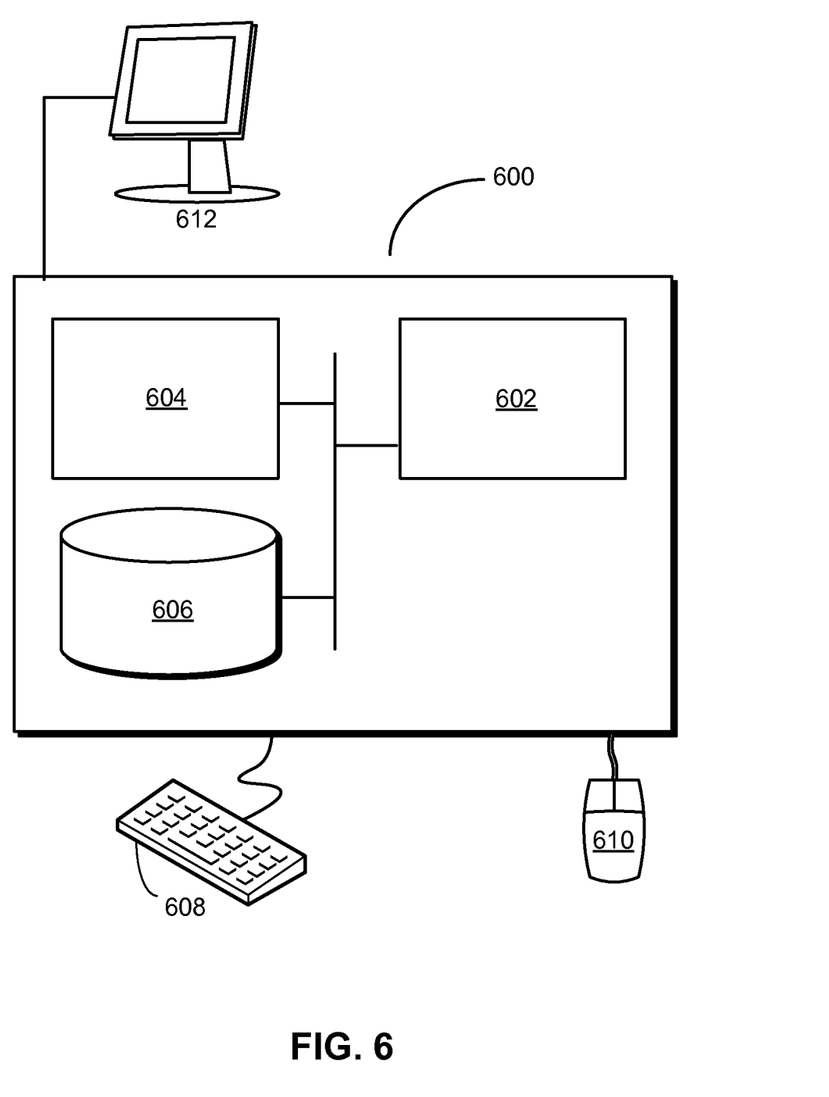
FIG. 6 shows a computer system in accordance with the disclosed embodiments.

FIG. 6 shows a computer system 600 in accordance with an embodiment. Computer system 600 includes a processor 602, memory 604, storage 606, and/or other components found in electronic computing devices. Processor 602 may support parallel processing and/or multi-threaded operation with other processors in computer system 600. Computer system 600 may also include input/output (I/O) devices such as a keyboard 608, a mouse 610, and a display 612.

Computer system 600 may include functionality to execute various components of the present embodiments. In particular, computer system 600 may include an operating system (not shown) that coordinates the use of hardware and software resources on computer system 600, as well as one or more applications that perform specialized tasks for the user. To perform tasks for the user, applications may obtain the use of hardware resources on computer system 600 from the operating system, as well as interact with the user through a hardware and/or software framework provided by the operating system.

In one or more embodiments, computer system 600 provides a system for facilitating data processing. The system may include a configuration apparatus that obtains a schema for data accessed using web services provided by multiple endpoints. The configuration apparatus may obtain the schema from a consumer of the data, such as a third-party developer. The configuration apparatus may also use the schema to create a custom endpoint for accessing the data. For example, the configuration apparatus may create the custom endpoint by using a query definition from the schema to construct a query for retrieving the data without using the multiple endpoints. The configuration apparatus may also create a first mapping from an entity name associated with the custom endpoint to the query and a second mapping from an identifier for the consumer to the entity name.

The system may also include an execution apparatus that enables, for the consumer, access to the data without requiring querying of the multiple endpoints. For example, the execution apparatus may obtain, from the consumer, a request containing one or more parameters for accessing the data. The execution apparatus may use the first and second mappings to match the request to the custom endpoint and the query, add the one or more parameters to the query to construct a final query, execute the final query against a database to obtain the data, and provide the data to the consumer.

In addition, one or more components of computer system 600 may be remotely located and connected to the other components over a network. Portions of the present embodiments (e.g., configuration apparatus, execution apparatus, custom endpoint, database, consumer, etc.) may also be located on different nodes of a distributed system that implements the embodiments. For example, the present embodiments may be implemented using a cloud computing system that creates and executes a set of custom endpoints for data access and retrieval by a set of remote consumers.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for facilitating data processing, comprising:
    obtaining a schema for data accessed using web services provided by multiple endpoints, wherein the schema is provided by a consumer of the data, and wherein the schema includes a query definition which defines entities, records, or fields to be joined using a custom endpoint;
    validating the schema by verifying a syntactic correctness and a structural correctness, resulting in a validated schema;
    after the validating, using the validated schema to create the custom endpoint for accessing the data, wherein using the validated schema to create the custom endpoint for accessing the data comprises:
    using the query definition from the validated schema to construct a query for retrieving the data without using the multiple endpoints;
    creating a first mapping from an entity name associated with the custom endpoint to the query; and
    creating a second mapping from an identifier for the consumer to the entity name, wherein the identifier for the consumer comprises either a username or a numerical user identifier; and
    enabling, for the consumer, access to the data through the custom endpoint according to the query definition without requiring querying of the multiple endpoints by the consumer.

2. The computer-implemented method of claim 1, wherein enabling, for the consumer, access to the data through the custom endpoint comprises:
    obtaining, from the consumer, a request comprising one or more parameters for accessing the data;
    adding the one or more parameters to the query to construct a final query;
    executing the final query against a database to obtain the data; and
    providing the data to the consumer.

3. The computer-implemented method of claim 2, wherein enabling, for the consumer, access to the data through the custom endpoint further comprises:
    using the first and second mappings to match the request to the custom endpoint and the query.

4. The computer-implemented method of claim 1, wherein the query comprises one or more joins among entities associated with the multiple endpoints.

5. The computer-implemented method of claim 1, wherein the custom endpoint comprises a representational state transfer (REST) component.

6. A system for facilitating data processing, comprising:
    a configuration apparatus configured to:
        obtain a schema for data accessed using web services provided by multiple endpoints, wherein the schema is provided by a consumer of the data, and wherein the schema includes a query definition which defines entities, records, or fields to be joined using a custom endpoint;
        validate the schema by verifying a syntactic correctness and a structural correctness, resulting in a validated schema, resulting in a validated schema; and
        after the validating, use the validated schema to create the custom endpoint for accessing the data, wherein using the validated schema to create the custom endpoint for accessing the data comprises:
        using the query definition from the validated schema to construct a query for retrieving the data without using the multiple endpoints;
        creating a first mapping from an entity name associated with the custom endpoint to the query; and
        creating a second mapping from an identifier for the consumer to the entity name, wherein the identifier for the consumer comprises either a username or a numerical user identifier; and
    an execution apparatus configured to enable, for the consumer, access to the data according to the query definition without requiring querying of the multiple endpoints.

7. The system of claim 6, wherein enabling, for the consumer,
    access to the data through the custom endpoint comprises:
    obtaining, from the consumer, a request comprising one or more parameters for accessing the data;
    using the first and second mappings to match the request to the custom endpoint and the query;
    adding the one or more parameters to the query to construct a final query; executing the final query against a database to obtain the data; and
    providing the data to the consumer.

8. The system of claim 6, wherein the query comprises one or more joins among entities associated with the multiple endpoints.

9. The system of claim 6, wherein the custom endpoint comprises a representational state transfer (REST) component.

10. A non-transitory computer-readable storage medium storing instructions that when executed by a computer cause the computer to perform a method for facilitating data processing, comprising:
- obtaining a schema for data accessed using web services provided by multiple endpoints, wherein the schema is provided by a consumer of the data, and wherein the schema includes a query definition which defines entities, records, or fields to be joined using a custom endpoint;
- validating the schema by verifying a syntactic correctness and a structural correctness, resulting in a validated schema, resulting in a validated schema;
- after the validating, using the validated schema to create the custom endpoint for accessing the data, wherein using the validated schema to create the custom endpoint for accessing the data comprises:
  - using the query definition from the validated schema to construct a query for retrieving the data without using the multiple endpoints;
  - creating a first mapping from an entity name associated with the custom endpoint to the query; and
  - creating a second mapping from an identifier for the consumer to the entity name, wherein the identifier for the consumer comprises either a username or a numerical user identifier; and
- enabling, for the consumer, access to the data according to the query definition through the custom endpoint without requiring querying of the multiple endpoints by the consumer.

11. The non-transitory computer-readable storage medium of claim 10, wherein enabling, for the consumer, access to the data through the custom endpoint comprises:
- obtaining, from the consumer, a request comprising one or more parameters for accessing the data;
- using the first and second mappings to match the request to the custom endpoint and the query;
- adding the one or more parameters to the query to construct a final query;
- executing the final query against a database to obtain the data; and
- providing the data to the consumer.

12. The non-transitory computer-readable storage medium of claim 10, wherein the query comprises one or more joins among entities associated with the multiple endpoints.

13. The non-transitory computer-readable storage medium of claim 10, wherein the custom endpoint comprises a representational state transfer (REST) component.

* * * * *